US007808497B2

(12) United States Patent
Lo et al.

(10) Patent No.: US 7,808,497 B2
(45) Date of Patent: Oct. 5, 2010

(54) DRIVING CIRCUIT AND METHOD FOR AMOLED USING POWER PULSE FEED-THROUGH TECHNIQUE

(75) Inventors: Shin-Tai Lo, Miaoli (TW); Wen-Tui Liao, Taichung (TW); Ching-Fu Hsu, Fongyuan (TW)

(73) Assignee: Wintek Corporation, Taichung Hsien (TW)

( * ) Notice: Subject to any disclaimer, the term of this patent is extended or adjusted under 35 U.S.C. 154(b) by 776 days.

(21) Appl. No.: 11/599,083

(22) Filed: Nov. 14, 2006

(65) Prior Publication Data

US 2008/0111809 A1 May 15, 2008

(51) Int. Cl.
*G06F 3/038* (2006.01)
*G09G 5/00* (2006.01)
*G09G 3/32* (2006.01)

(52) U.S. Cl. ....................... 345/212; 345/204; 345/211; 345/82

(58) Field of Classification Search .......... 345/204–215
See application file for complete search history.

(56) References Cited

U.S. PATENT DOCUMENTS

| | | | | |
|---|---|---|---|---|
| 7,167,169 | B2 * | 1/2007 | Libsch et al. | 345/211 |
| 7,580,015 | B2 * | 8/2009 | Tai et al. | 345/82 |
| 2003/0107565 | A1 * | 6/2003 | Libsch et al. | 345/211 |

* cited by examiner

*Primary Examiner*—Sumati Lefkowitz
*Assistant Examiner*—Charles Hicks
(74) *Attorney, Agent, or Firm*—Muncy, Geissler, Olds & Lowe, PLLC

(57) ABSTRACT

An AMOLED driving circuit and driving method adds an additional switching transistor to a 2T1C driving circuit. An additional switching transistor is connected to the high voltage source, a scan line and a node connected a source terminal of a driving transistor of the 2T1C driving circuit and the light-emitting device. The additional switching transistor and an original switching transistor of the 2T1C driving circuit are activated when the scan line outputs high voltage. At the time, a low voltage of a PWM voltage is added to the high voltage source not to drive the driving transistor, and a storage capacitor stores a voltage of the image data signal. When the two switching transistors turn off and a high voltage of the PWM voltage is provided to the high voltage source, the driving transistor is driven to generate a driving current to the light-emitting device.

5 Claims, 10 Drawing Sheets

DRIVING CIRCUIT AND METHOD FOR AMOLED USING POWER PULSE FEED-THROUGH TECHNIQUE

BACKGROUND OF THE INVENTION

1. Field of the Invention

The present invention relates to a driving circuit and method of an active matrix organic light-emitting device (AMOLED), and more particularly to a driving technique that uses the power pulse feed-through technique to stabilize the current flowing through the light-emitting device.

2. Description of Related Art

There are many types of flat panel display in the market, such as LCD, PDP and OLED etc. At present, the OLED products still suffer from many technique problems needed to be solved. For example, a driving voltage ($V_{OLED}$) is dropped on the organic light-emitting device when the organic light-emitting device is driven by the driving circuit. The driving voltage ($V_{OLED}$) is gradually increased with time to unsteady the driving current during the organic light-emitting device is driven, since the material characterization of the organic light-emitting device. In addition, the threshold voltage of a driving transistor in driving circuit has similar material problem. The threshold voltage is increased with time when the driving transistor is driven for a long time. The increasing threshold voltage unsteadies the driving current to affect the image quality of the organic light-emitting device.

With reference to FIG. 6, a typical OLED driving circuit with a 2T-1C configuration includes a switching transistor (M1), a driving transistor (M2), and a storage capacitor ($C_s$). The conventional driving circuit is also disclosed in prior art of the U.S. Pat. No. 6,680,580 (hereinafter '580) and U.S. Pat. No. 6,677,713 (hereinafter '713). A gate terminal (G) of the switching transistor (M1) is connected to a scan line to receive a scanning signal ($V_{scan}$), a drain terminal (D) of the switching transistor (M1) is connected to a data line to receive an image data signal ($V_{data}$), and a source terminal (S) is connected to a gate terminal (G) of the driving transistor (M2) to control ON/OFF states of the driving transistor (M2). If the driving transistor (M2) is an n-channel type transistor, its drain terminal (D) is connected to a high or positive voltage source ($V_{DD}$) and its source terminal (S) is connected to an anode of the organic light-emitting device (OLED). The cathode of the organic light-emitting device (OLED) is connected to a low or negative voltage source ($V_{SS}$). The storage capacitor ($C_s$) is connected between the gate terminal (G) of the driving transistor (M2) and a reference voltage ($V_{ref}$). The storage capacitor ($C_s$) can assist the driving transistor (M2) to be kept in either the ON or OFF states.

When the gate terminal (G) of the switching transistor (M1) receives the scanning signal ($V_{scan}$) provided by the scan line, the image data signal ($V_{data}$) is transmitted to the gate terminal (G) of the driving transistor (M2) and the storage capacitor ($C_s$). If the voltage of the image data signal ($V_{data}$) is larger than a threshold voltage ($V_{th}$) of the driving transistor (M2), the driving transistor (M2) will become conducted to allow a driving current ($I_{D2}$) to activate the light-emitting device.

However, with reference to FIG. 7 and FIG. 8, if the organic light-emitting device (OLED) has been operated for a long time, the OLED driving voltage ($V_{OLED}$) may gradually increase which results in a reduction in the driving current ($I_{D2}$). As a result, the brightness of the organic light-emitting device (OLED) weakens. Equations with regard to the driving current ($I_{D2}$) in the conductive condition are shown to explain the relationship between the OLED driving voltage ($V_{OLED}$) and the brightness of the organic light-emitting device (OLED).

$$I_{D2} = \frac{1}{2}\mu C_{OX}\frac{W}{L}(V_{GS2} - V_{th2})^2$$

$$I_{D2} = \frac{1}{2}\mu C_{OX}\frac{W}{L}(V_{G2} - V_{S2} - V_{th2})^2$$

$$\text{where } V_{S2} = V_{OLED} + V_{SS}$$

$$I_{D2} = \frac{1}{2}\mu C_{OX}\frac{W}{L}(V_{G2} - V_{OLED} - V_{SS} - V_{th2})^2$$

Based on the above equations, the decrease in driving current ($I_{D2}$) occurs when the OLED driving voltage ($V_{OLED}$) increases. The OLED driving voltage ($V_{OLED}$) of the organic light-emitting device (OLED) increases with time while the driving current ($I_{D2}$) decreases with time. In addition, after supplying the positive voltage to the gate and source terminals (G, S) of the driving transistor (M2) for a long time, the threshold voltage ($V_{th}$) is also increased with further reference to FIG. 9.

Based on foregoing description, an unstable voltage of the organic light-emitting device (OLED) and a variable threshold voltage ($V_{th}$) of the driving transistor (M2) will reduce the brightness of the organic light-emitting device (OLED).

Therefore, the image display of the organic light-emitting device is not good after driving for a long time. To improve material fault of the organic light-emitting device and the driving transistor, many flat panel display factories accordingly propose many modified driving circuits to overcome the fault to improve the display quality of the OLED product.

With reference to FIG. 10, the same with FIG. 4 of the '713 patent, an OLED driving circuit with a 3T1C configuration is disclosed to maintain the threshold voltage ($V_{th}$) of a driving transistor (M2) at a stable value after long operation time of image display. The driving circuit of the '713 patent is formed by incorporating a 2T1C driving unit with an additional switching transistor (M3). A gate terminal (G) of the additional switching transistor (M3) is connected to another scan line, a drain terminal (D) thereof is connected to the gate terminal (G) of the driving transistor (M2) of the 2T1C driving unit, and a source terminal (S) is connected to another reference voltage source ($V_{ref2}$) with a low voltage. With further reference to FIG. 11, there are two pulse signals ($V_{scanA}$ and $V_{scanB}$) to be supplied to the two scan lines respectively. The two pulse signals have the same frequency and a delay time exists there between. When the two pulse signals ($V_{scanA}$ and $V_{scanB}$) are supplied to the two scan lines respectively, the two switching transistors (M1, M3) will be activated alternately. Therefore, the gate terminal (G) of the driving transistor (M2) receives alternate high/low voltages. Regarding to the low voltage supplied to the gate terminal (G) of the driving transistor (M2), the driving transistor (M2) will be turned off to stop the driving current ($I_D$) to the organic light-emitting device (OLED), so we called this condition as Negative bias annealing technique. Since the driving transistor (M2) is alternately controlled in ON/OFF states, the variable threshold voltage ($V_{th}$) of the driving transistor (M2) can be solved. However, since this 3T1C driving circuit uses one additional switching transistor (M3), another scan line and reference voltage ($V_{ref2}$) are required. Not only the aperture ratio of each pixel of the OLED product will be decreased, but also the layout of an extra control lines are more complex. In addition, the 3T1C driving circuit does not make the voltage of the organic light-emitting device (OLED) in a stable value.

Therefore, the brightness of the organic light-emitting device is (OLED) still decreasing with time.

With reference to FIG. 12, the same with the FIG. 4 of the '580 patent, another 3T1C configuration of an OLED driving circuit is disclosed to maintain the driving voltage of the organic light-emitting device (OLED) on a stable value even under a long time operation of displaying image. The driving circuit has a first switching transistor (M1), a driving transistor (M2), a storage capacitor ($C_S$) and a second switching transistor (M3). Two gate terminals (G) of the first and second switching transistors (M1, M3) are connected to the same scan line ($V_{scan}$). The two source terminals (S) of the first switching transistor and driving transistor (M1, M2) are respectively connected to the two ends of the storage capacitor (Cs). The drain terminal (D) of the first switching transistor (M1) is connected to the data line ($V_{data}$). The drain terminal (D) of the driving transistor (M2) is connected to the high or positive voltage ($V_{DD}$). The gate terminal (G) of the driving transistor (M2) is connected to the source terminal (S) of the first switching transistor (M1). The drain terminal (D) of the second switching transistor (M3) is connected to the source terminal (S) of the driving transistor (M2).

The source terminal (S) of the driving transistor (M2) is further connected to an anode of the organic light-emitting device (OLED) and a cathode of the organic light-emitting device (OLED) is connected to a low or negative voltage source ($V_{SS}$).

The second switching transistor (M3) is connected between the source terminal (S) of the driving transistor (M2) and a common voltage ($V_{com}$). Therefore, when the first and second switching transistors (M1, M3) are all activated, the common voltage ($V_{com}$) is directly supplied to the source terminal (S) of the driving transistor (M2). That is, the voltage of the source terminal (S) of the driving transistor (M2) does not change according to the variable driving voltage ($V_{OLED}$) of the organic light-emitting device (OLED). Thus, the driving current ($I_D$) is represented as follow:

$$V_g = V_{data}$$

$$V_s = V_{com}$$

$$I_D = \frac{1}{2}\mu C_{OX}\frac{W}{L}(V_{data} - V_{com} - V_{th})^2$$

The driving current ($I_D$) can be maintained in a stable value. With further reference to FIG. 13, the '580 patent uses a pulse signal as a frame signal, wherein the pulse is consisted of one purposely-interleaved frame (OFF) between two original frames (ON), to practice negative bias annealing technique to keep the threshold voltage ($V_{th}$) of the driving transistor (M2) in a stable value. In $n^{th}$ frame, since the frame state is at a high level (ON), the image data signal ($V_{data}$) is high and supplied to the gate terminal (G) of the driving transistor (M2). At the same time, the first and second switching transistors (M1, M3) are conductive when the voltage ($V_{scan}$) of the scan line is high. Meanwhile, the source terminal (S) of the driving transistor (M2) obtains the common voltage ($V_{com}$) through the conductive second switching transistor (M3) ($Vs=V_{com}$). The image data signal ($V_{data}$) will be supplied to the gate terminal (G) of the driving transistor (M2) ($V_g=V_{data}$). Further, the common voltage ($V_{com}$) is smaller than the voltage of the image data signal ($V_{data}$). Therefore, the voltage of the image data signal ($V_{data}$) subtracts the common voltage ($V_{com}$) to have the potential between the gate and source terminals (G, S) of the driving transistor (M2) ($V_{GS}=V_{data}-V_{com}$). Since the driving transistor (M2) obtains a bias voltage, the driving current ($I_D$) passes through the organic light-emitting device (OLED). In next frame, the frame state is low level to make the voltage of the image data signal ($V_{data}$) being lower than the common voltage ($V_{com}$). Therefore, the driving transistor (M2) is not conductive to complete the negative bias annealing technique.

Although the driving circuit of '580 patent can avoid the change in the driving current ($I_D$) resulted from the increased voltage of the organic light-emitting device (OLED) and maintain the threshold voltage ($V_{th}$) of the driving transistor (M2) in a stable value, the driving circuit still has the drawbacks as follow:

1. The driving current ($I_D$) through the organic light-emitting device (OLED) is decreased, the brightness of the organic light-emitting device (OLED) weakens accordingly. When the voltage ($V_{scan}$) of the scan line is high, the first and second switching transistors (M1, M3) are conductive and the gate voltage of the driving transistor (M2) is equal to the voltage (Vg) of the data line. Then, the driving transistor (M2) and the second switching transistor (M3) are conductive. The conductive driving and second switching transistors (M2, M3) respectively have an inner resistance ($R_{M2}$) ($R_{M3}$), so the voltage ($V_S$) of the source terminal of the driving transistor (M2) is represented by $$\frac{R_{M3}}{R_{M2} + R_{M3}} \times (V_{DD} - V_{COM}).$$

Therefore, the voltage ($V_S$) of the source terminal of the driving transistor (M2) is not equal to the common voltage (Vcom).

2. The '580 patent uses a pulse signal as a frame signal, wherein the pulse is consisted of one purposely-interleaved frame (OFF) between two original frames (ON) to practice negative bias annealing technique to maintain the threshold voltage (Vth) in a stable value. Therefore, the original frame is shortened, as a result, the image display quality of the OLED product is affected.

With reference to FIG. 14, another 3T1C driving circuit disclosed by Li in the U.S. Pat. No. 6,756,741 (hereinafter '741) has a first and second switching transistors (M1, M2), a driving transistor (M3) and a storage capacitor ($C_S$). Two gate terminals (G) of the first and second switching transistors (M1, M2) are connected to the same scan line. Two drain terminals (D) of the second switching transistor (M2) and the driving transistor (M3) are connected to the high or positive voltage source ($V_{DD}$). A source terminal (S) of the second switching transistor (M2) and a gate terminal (G) of the driving transistor (M3) are connected to one end of the storage capacitor ($C_S$). A drain terminal (D) of the first switching transistor (M1) and a source terminal (S) of the driving transistor (M2) are connected to the other end of the storage capacitor ($C_S$) and an anode of the organic light-emitting device (OLED). A cathode of the organic light-emitting device (OLED) is connected to ground.

When the scan line has a high voltage, the first and second switching transistors (M1, M2) are turned on. At the time, the two ends of the storage capacitor ($C_S$) respectively obtain a voltage of the image data signal ($V_{data}$) and a high voltage source ($V_{DD}$). The potential between the gate and source terminals (G, S) of the driving transistor (M3) can be driven by subtracting the voltage of the image data signal from the high voltage source ($V_{GS}=V_{DD}-V_{data}$). The bias voltage of the driving transistor (M3) is affected by the voltage of the organic light-emitting device (OLED). However, the voltage over the storage capacitor ($C_S$) is not equal to the voltage of the image data signal ($V_{data}$) to generate a static current, since the first switching transistor (M1) and the organic light-emitting device (OLED) are resistance elements. Therefore, quality of the image display is worse than that of the foregoing mentioned 3T1C driving circuits in '580 and '713 patents. In addition, the '741 patent still has the problem of variable threshold voltage.

Therefore, the present invention provides a new 3T1C driving circuit for AMOLED product to overcome the material faults of organic light-emitting device and the driving transistor caused unstable driving current.

SUMMARY OF THE INVENTION

The main objective of the present invention is to provide an AMOLED driving circuit that not only maintains a threshold voltage of a driving transistor and voltage of one light-emitting device in a stable value, but an addition switching transistor does not cause any negative effective related to quality of image display.

An AMOLED driving circuit and driving method adds an additional switching transistor to a 2T1C driving circuit. An additional switching transistor is connected to the high voltage source, a scan line and a node connected a source terminal of a driving transistor of the 2T1C driving circuit and the light-emitting device. The additional switching transistor and an original switching transistor of the 2T1C driving circuit are activated when the scan line outputs high voltage. At the time, a low voltage of a PWM voltage is added to the high voltage source not to drive the driving transistor, and a storage capacitor stores a voltage of an image data signal. When the two switching transistors turn off and a high voltage of the PWM voltage is provided to the high voltage source, the driving transistor is driven to generate a driving current to the light-emitting device.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
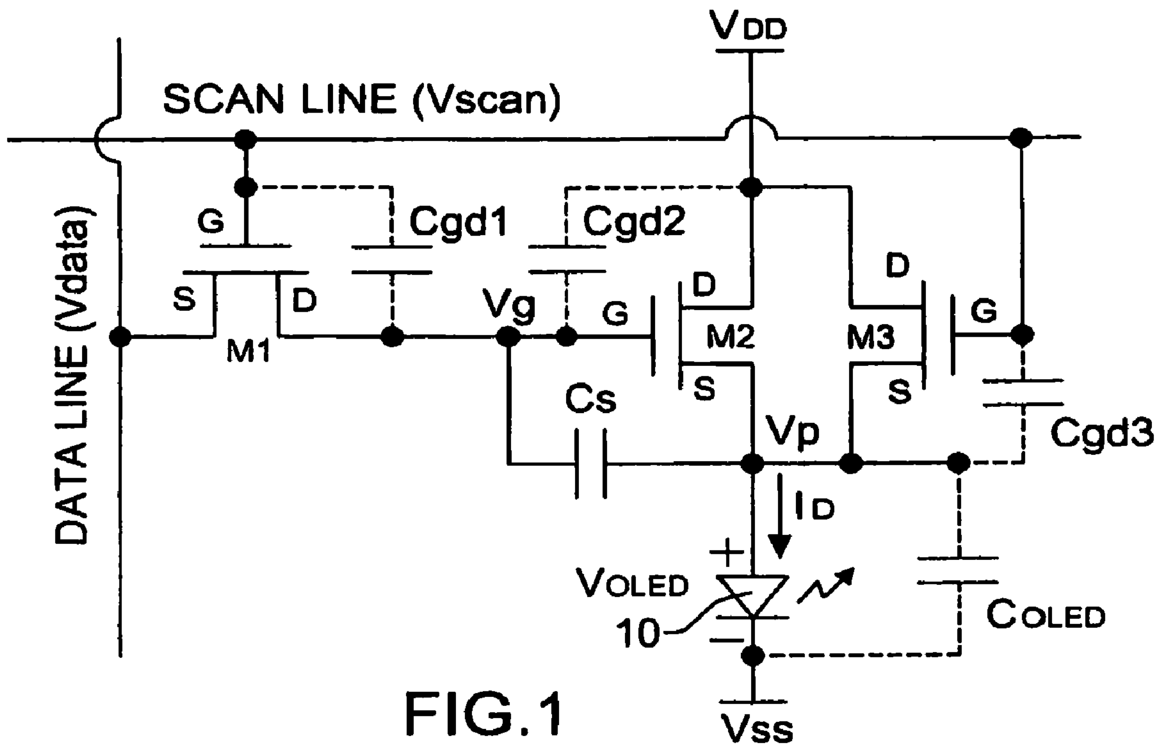
FIG. 1 is a circuit diagram of a first embodiment of a driving circuit in accordance with the present invention.

With reference to FIG. 1, a first embodiment of an AMOLED driving circuit controls a light-emitting device, such as organic light-emitting device, in one pixel. The driving circuit is connected to a scan line providing a scanning voltage ($V_{scan}$), a data line providing a image data signal ($V_{data}$), a controllable voltage source ($V_{DD}$) having a pulse width modulation signal, a constant low voltage source ($V_{SS}$) having a constant voltage and a light-emitting device (10).

Transistors (M1, M2, M3) in the driving circuit can be N-channel TFT. Each one has a gate, a source and a drain terminals (G, S, D). In this preferred embodiment, each transistor (M1, M2, M3) is the N-channel TFT. The source terminal (S) of the first switching transistor (M1) is connected to the data line, the drain terminal (D) of the first switching transistor (M1) is connected to one end of the storage capacitor (Cs) and a gate terminal (G) is connected to the scan line.

The drain terminal (D) of the driving transistor (M2) is connected to the controllable voltage source ($V_{DD}$), a source terminal (S) of the driving transistor (M2) is connected to the other end of the storage capacitor ($C_S$), and the gate terminal (G) is connected to the source terminal (S) of the first switching transistor (M1) and the end of the capacitor ($C_S$).

The drain terminal (D) of the second switching transistor (M3) is connected to the controllable voltage source ($V_{DD}$), the source terminal (S) of the second switching transistor (M3) is connected to the source terminal (S) of the driving transistor (M2) and the gate terminal (G) of the second switching transistor (M3) is connected to the scan line.

Since the preferred embodiment of the AMOLED driving circuit uses N-channel TFT, the anode of the light-emitting device (10) is connected to the source terminal (S) of the driving transistor (M2) and the cathode terminal of the light-emitting device (10) is connected to the low voltage terminal ($V_{SS}$).

Figure 2:
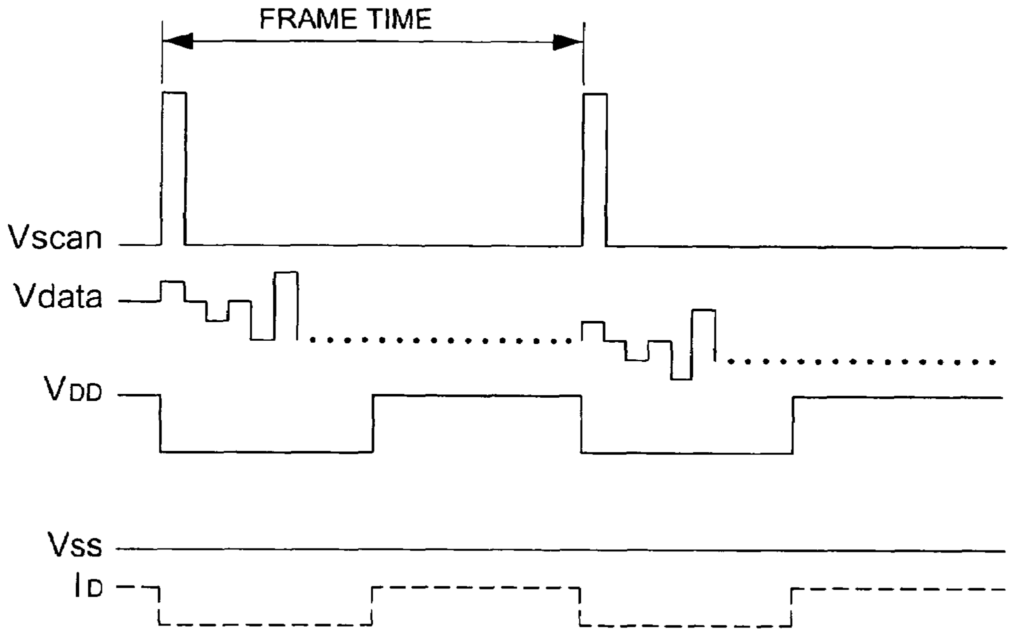
FIG. 2 is a waveform diagram of the driving circuit in accordance with the present invention.

With further reference to FIG. 2, the diagram shows voltage waveforms of the scan line ($V_{scan}$), the data line ($V_{data}$), the controllable voltage source ($V_{DD}$), the low voltage terminal ($V_{SS}$) and a current waveform of a driving current ($I_D$) of the light-emitting device (10). The controllable voltage source ($V_{DD}$) outputs a pulse width modulation (PWM) signal and the modulating cycle of the PWM signal is corresponding to one frame time period. For example if the operating cycle of the PWM signal is adjusted to 50%, the controllable voltage source ($V_{DD}$) provides the high voltage to the drain terminals (D) of the driving transistor (M2) and the second switching transistor (M3) in a half of the frame.

Therefore, in a half of the frame, the source terminal (S) of the driving transistor (M2) obtains the low voltage from the controllable voltage source ($V_{DD}$) through the activated second switching transistor (M3). When the scan line ($V_{scan}$) provides a low voltage, the first and second switching transistors (M1, M3) are not activated, but the storage capacitor ($C_S$) has stored the constant voltage of the image data signal to avoid the variation of the driving voltage for the light-emitting device (10). In the other half of the frame, the controllable voltage source ($V_{DD}$) outputs the high voltage to activate the driving transistor (M2) to produce a driving current ($I_D$) activating the light-emitting device (10).

Figure 3:
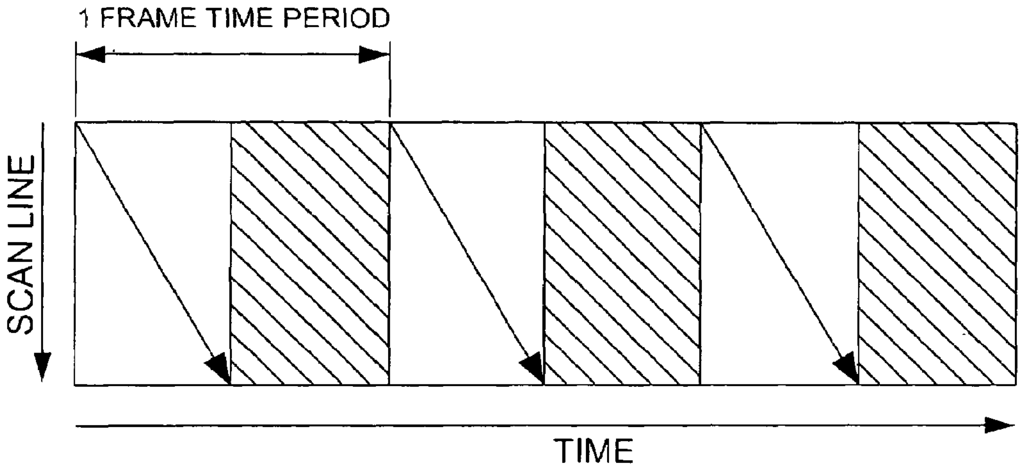
FIG. 3 is an operation schematic diagram in three frames in accordance with the present invention.

Based on the foregoing description, with further reference to FIG. 3, since the controllable voltage source ($V_{DD}$) provides the PWM signal with high and low voltage levels, the driving circuit has two operations during one frame time period, as follow:

1. In the former half frame, the driving circuit is used to store the voltage of the image data signal because the first and second switching transistors (M1, M3) are activated by the high voltage ($V_{scan}$) provided by the scan line.

2. In the later half frame, the driving circuit is used to drive the light-emitting device (10) to emit light since the driving transistor (M2) is activated by the high voltage level output from the controllable voltage source ($V_{DD}$).

Further, the controllable voltage source ($V_{DD}$) with the PWM signal also solves that the driving transistor (M2) does not have a variable threshold voltage ($V_{th}$) when the driving transistor (M2) has been operated for a long time. Since the driving transistor (M2) is mainly used to provide a driving current ($I_D$) to the light-emitting device (10), the driving transistor (M2) has to be fabricated with a large size. However, the large size of the driving transistor (M2) will incur a large parasitic capacitor ($C_{gd2}$) between its gate and drain terminals. Therefore, the voltage of the gate terminal (G) of the driving transistor (M2) increases with time, so the gate terminal (G) has a positive voltage deviation ($\Delta V_N$). Since the controllable voltage source ($V_{DD}$) outputs a PWM signal, the positive voltage deviation ($\Delta V_N$) can compensate the variable threshold voltage ($V_{th}$). Since the first and second switching transistors (M1, M3) also have parasitic capacitors ($C_{gd1}$, $C_{gd3}$) respectively between their gate and drain terminals (G, D), the positive voltage deviation ($\Delta V_N$) can be calculated by the equations as follow:

$$Q_{charge}=C_{gd1}\times(V_N-V_G)+C_{gd2}(V_N-V_{DD})+C_S\times(V_N-V_P)$$

$$Q_{discharge}=C_{gd1}\times(V_N'-V_G')+C_{gd2}(V_N'-V_{DD}')+C_S\times(V_N'-V_P')$$

Where, $Q_{charge}=Q_{discharge}$;

$$C_{gd1}V_N-C_{gd1}V_G+C_{gd2}V_N-C_{gd2}V_{DD}+C_SV_N-C_SV_P=$$

$$C_{gd1}V_N'-C_{gd1}V_G'+C_{gd2}V_N'-C_{gd2}V_{DD}'+C_SV_N'-C_SV_P'$$

$$C_{gd1}\Delta V_N-C_{gd1}\Delta V_G+C_{gd2}\Delta V_N-C_{gd2}\Delta V_{DD}+C_S\Delta V_N-C_S\Delta V_P=0$$

$$\Delta V_N=\frac{[C_{gd1}\Delta V_G+C_{gd2}\Delta V_{DD}+C_S\Delta V_P]}{C_{gd1}+C_{gd2}+C_S}$$

To prove that the positive voltage deviation ($\Delta V_N$) can compensate the variable threshold voltage ($V_{th}$) of the driving transistor (M2), the positive voltage deviation ($\Delta V_N$) replaces the driving current ($I_D$) in the following equation:

$$I_D=\frac{1}{2}\mu C_{OX}\frac{W}{L}(V_{GS}-\Delta V_N-V_{th}-\Delta V_{TH,shift})^2$$

Since the positive voltage deviation ($\Delta V_N$) and shift voltage ($V_{TH,shift}$) of the threshold voltage ($V_{th}$) increase with time, the positive voltage deviation ($\Delta V_N$) compensates the increase in the threshold voltage ($V_{th}$) according to the foregoing equations. Therefore, in one frame, the positive voltage deviation ($\Delta V_N$) generated by the parasitic capacitor ($C_{gd2}$) at the rising time of the controllable voltage source compensates the increase of the threshold voltage ($V_{th}$).

Figure 4A:
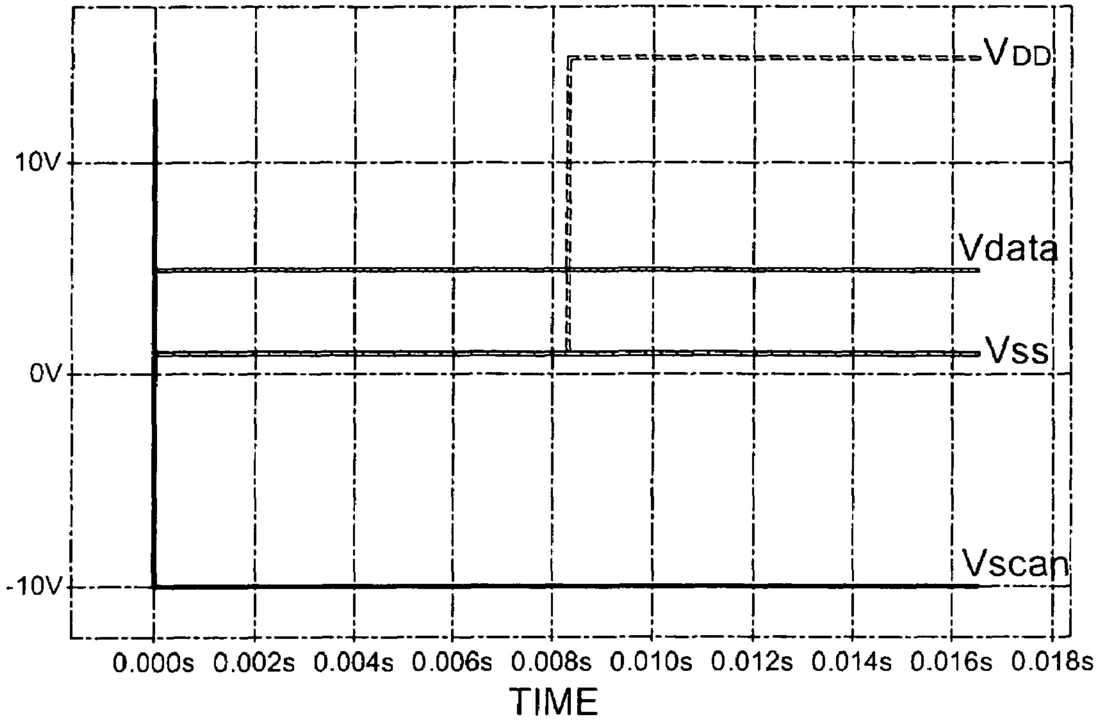
FIG. 4A is a diagram of voltage waveforms of input signals, when the driving circuit receives a constant high voltage of the image data signal from a data line.
Figure 4B:
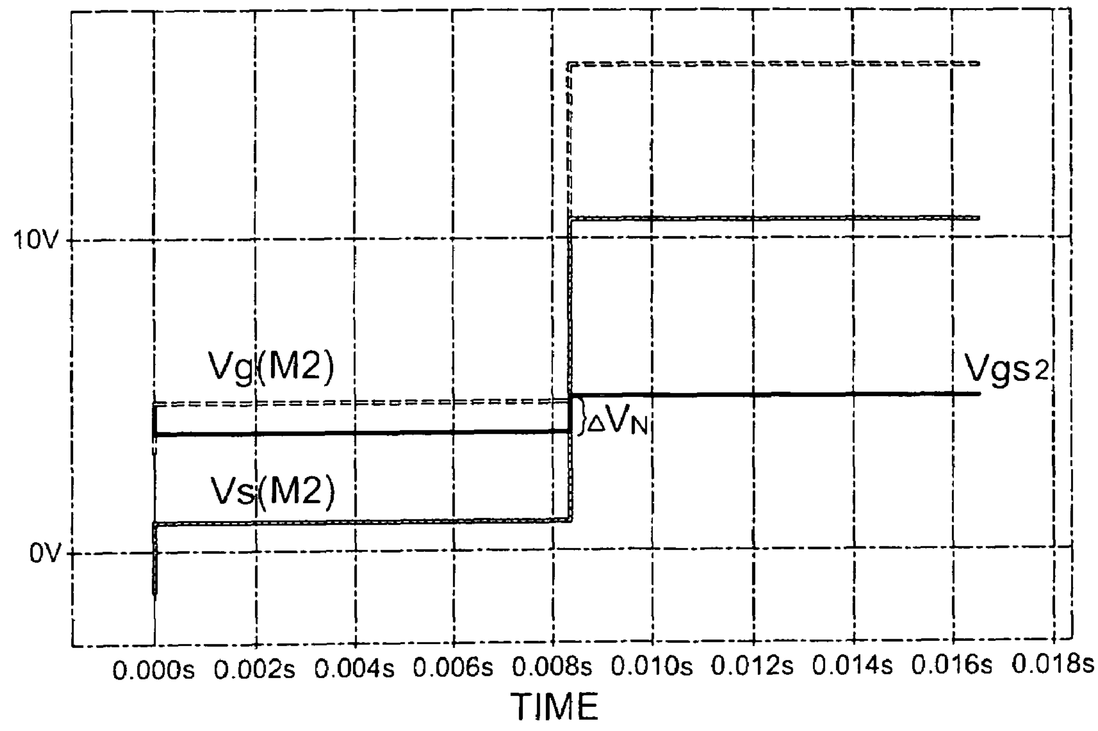
FIG. 4B is a diagram of voltage waveforms of a gate and a source terminals of a driving transistor of the driving circuit while the constant high voltage of the image data signal is added to the driving circuit.
Figure 4C:
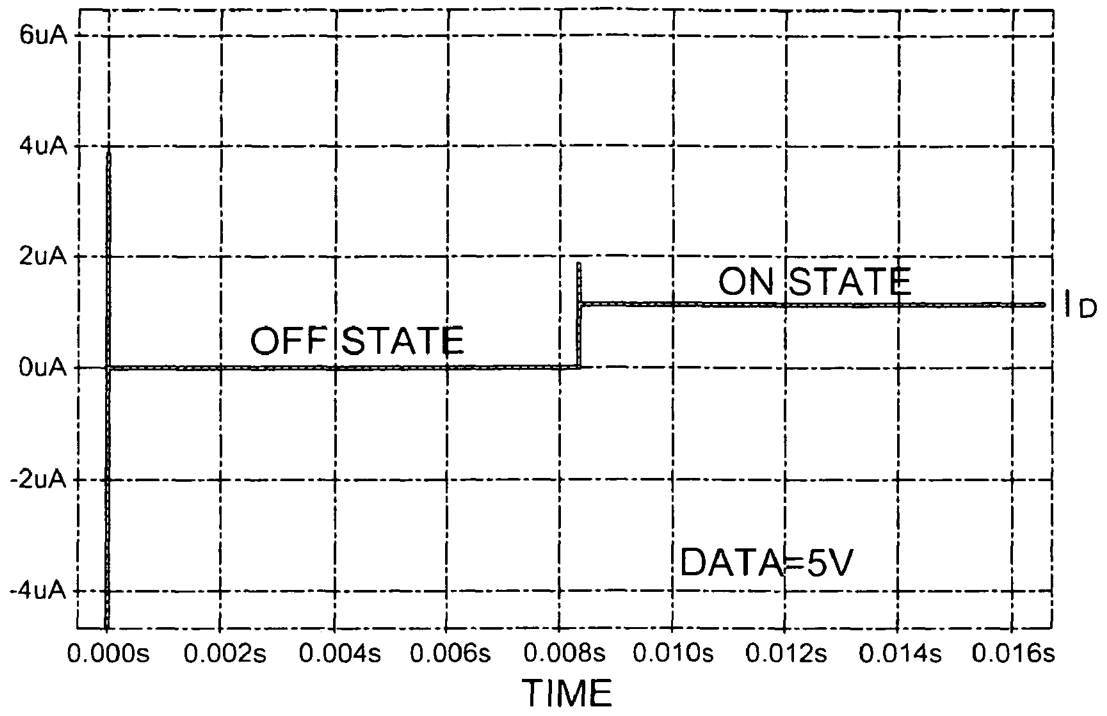
FIG. 4C is a diagram of a current waveform of a driving current generated by the driving transistor of the driving circuit while the constant high voltage of the image data signal is added to the driving circuit.

With reference to FIGS. 4A to 4C, these diagrams show different voltage waveforms of the driving circuit in one frame when the data line outputs a constant high voltage of the image data signal (5 V). Referring to FIG. 4B, the voltage waveforms of the gate and source terminals (G, S) of the driving transistor (M2) show the positive voltage deviation ($\Delta V_N$) generated by the parasitic capacitor ($G_{gd2}$) at the rising time of the controllable voltage source ($V_{DD}$). Referring to FIG. 4C, the driving current (about 1.5 μA) is generated by the driving transistor at the "ON" state when the high modulated high voltage exists.

Figure 5A:
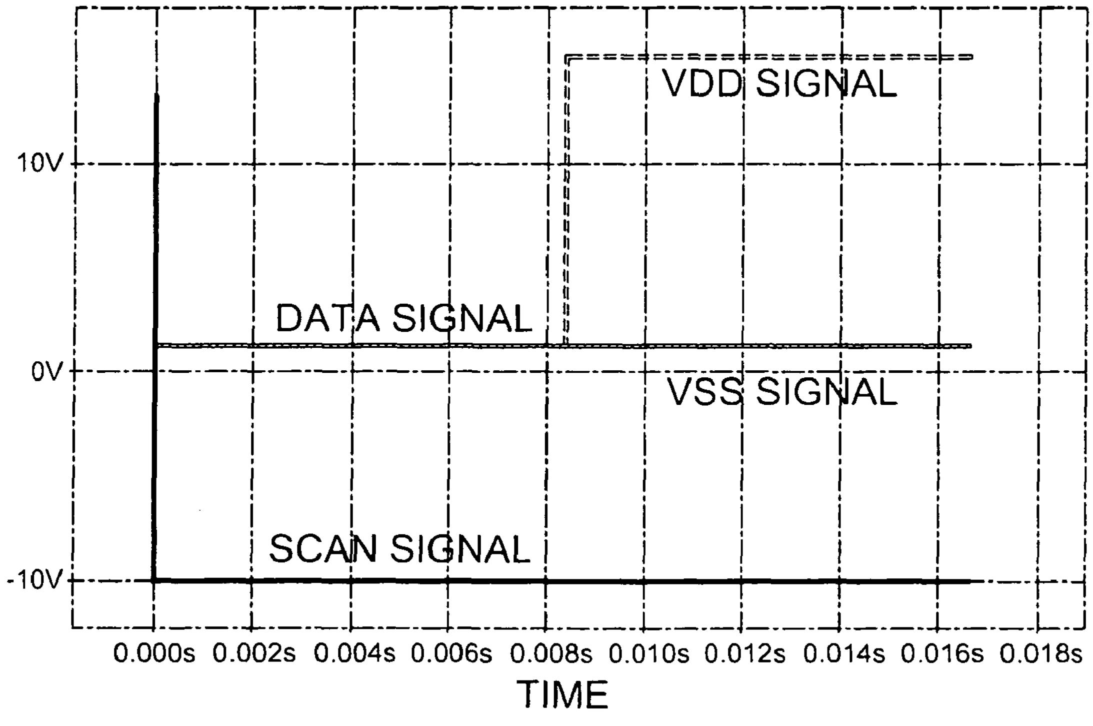
FIG. 5A is a diagram of voltage waveforms of input signals, when the driving circuit receives a constant low voltage of the image data signal from a data line.
Figure 5B:
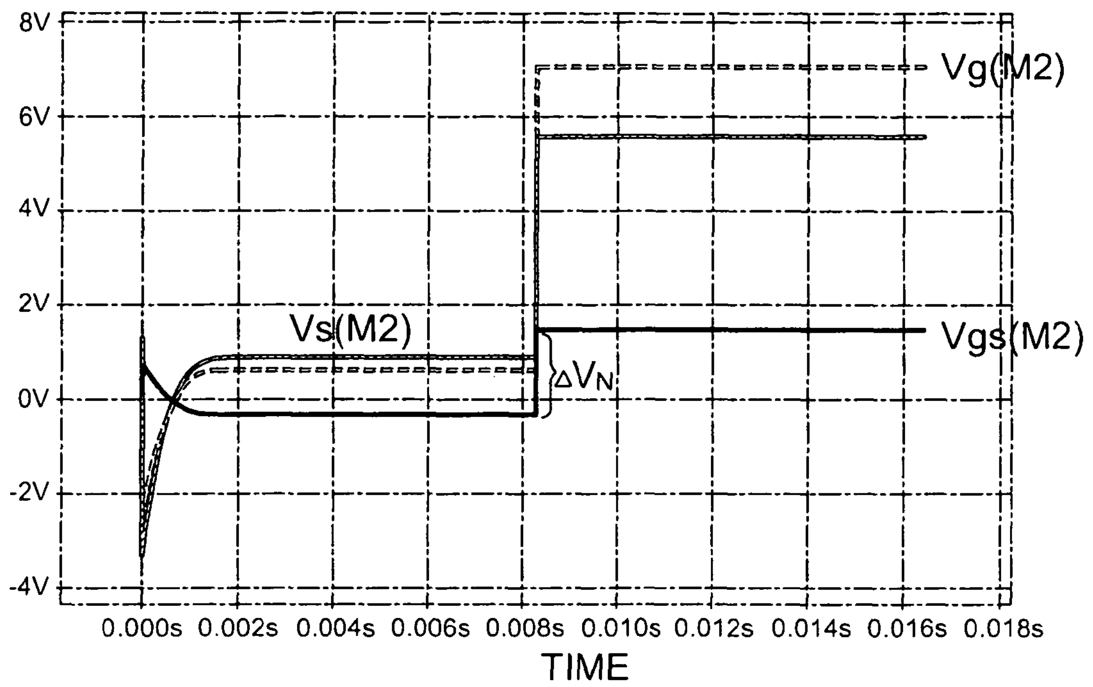
FIG. 5B is a diagram of voltage waveforms of the gate and a source terminals of a driving transistor of the driving circuit while the constant low voltage of the voltage of the image data signal from a data line.
Figure 5C:
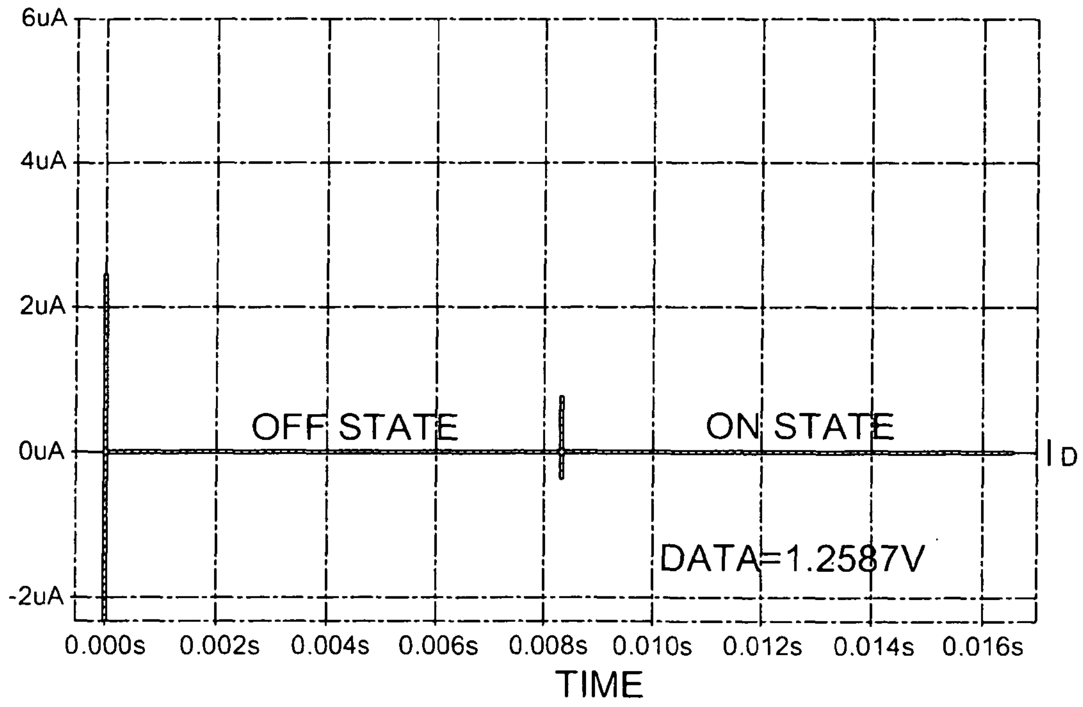
FIG. 5C is a diagram of a current waveform of a driving current generated by the driving transistor of the driving circuit while the driving circuit receives a constant low voltage of image data signal from a data line.
Figure 6:
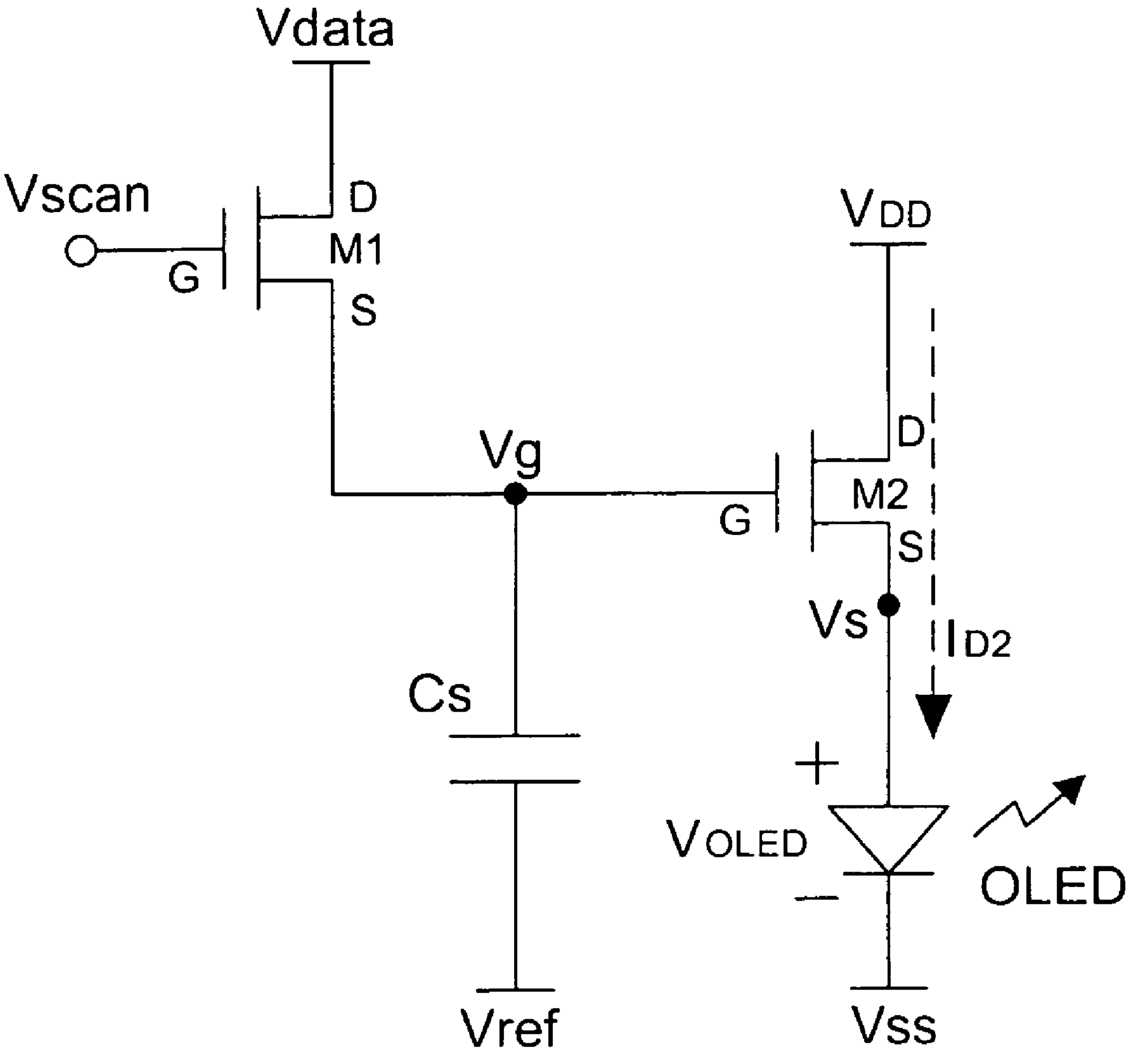
FIG.6 PRIOR ART
FIG. 6 is a circuit diagram of a 2T1C driving circuit in accordance with the prior art.
Figure 7:
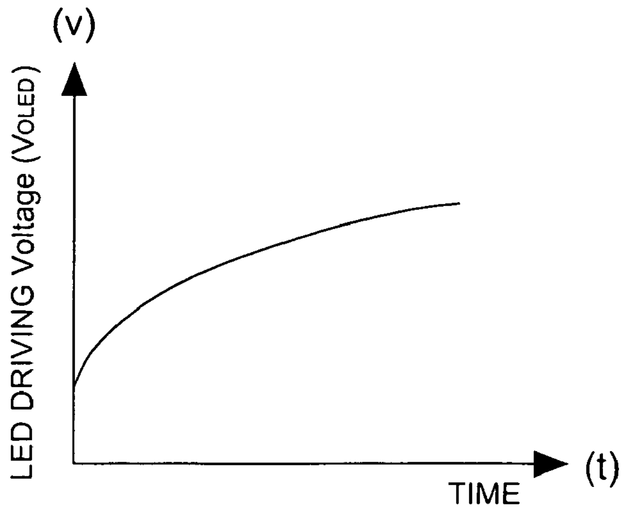
FIG.7 PRIOR ART
FIG. 7 is a voltage waveform of a driving voltage of a light-emitting device driven by the 2T1C driving circuit of FIG. 6.
Figure 8:
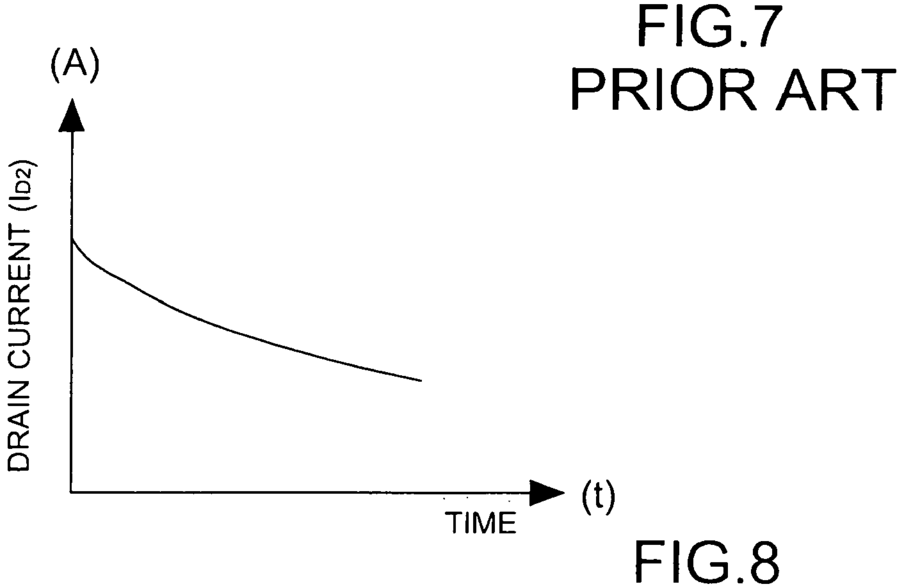
FIG.8 PRIOR ART
FIG. 8 is a current waveform of a driving current of a driving transistor of the 2T1C driving circuit of FIG. 6.
Figure 9:
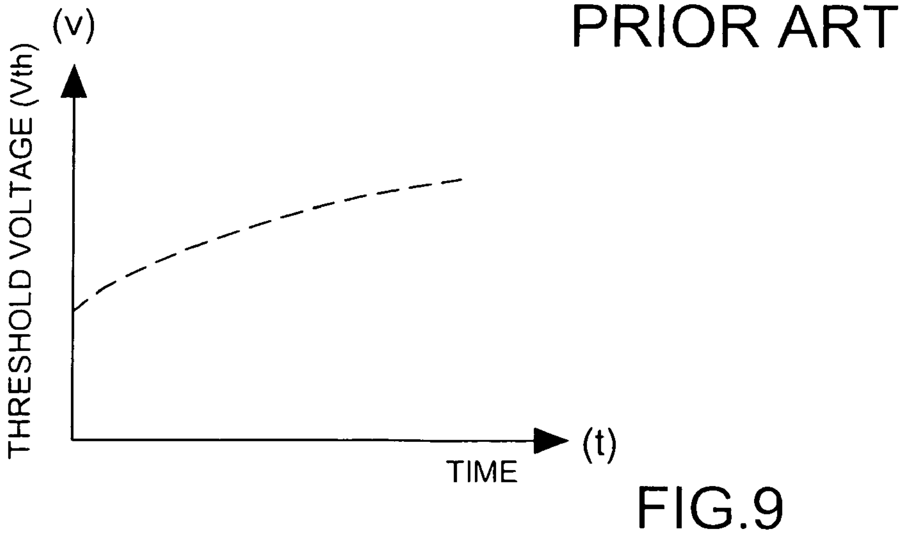
FIG.9 PRIOR ART
FIG. 9 is a voltage waveform of a threshold voltage of the driving transistor of the 2T1C driving circuit of FIG. 6.
Figure 10:
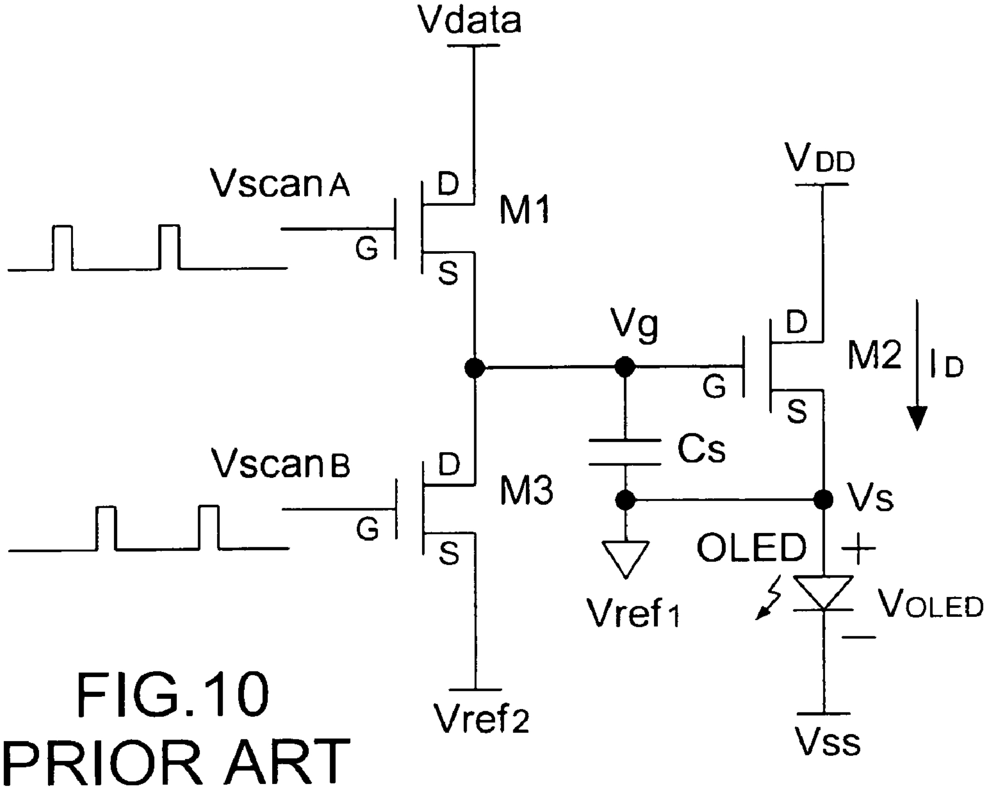
FIG.10 PRIOR ART
FIG. 10 is a circuit diagram of a first 3T1C driving circuit in accordance with the U.S. Pat. No. 6,680,580.
Figure 11:
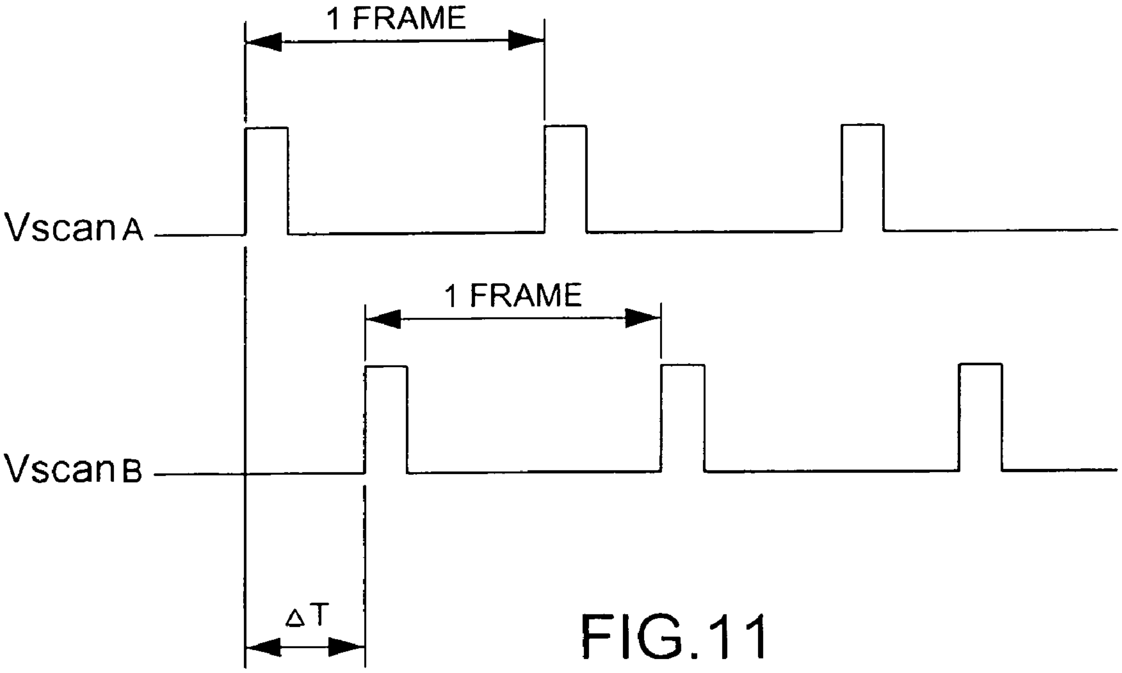
FIG.11 PRIOR ART
FIG. 11 is a diagram of voltage waveforms of two scan lines of the 3T1C driving circuit of FIG. 10.
Figure 12:
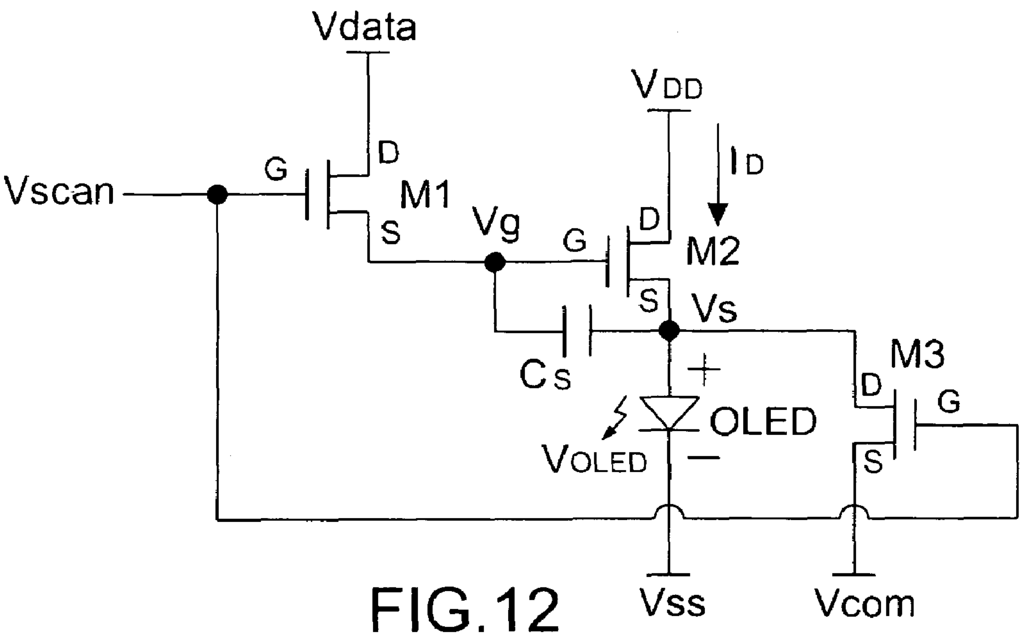
FIG.12 PRIOR ART
FIG. 12 is a circuit diagram of a second 3T1C structure driving circuit in accordance with the U.S. Pat. No. 6,680, 580.
Figure 13:
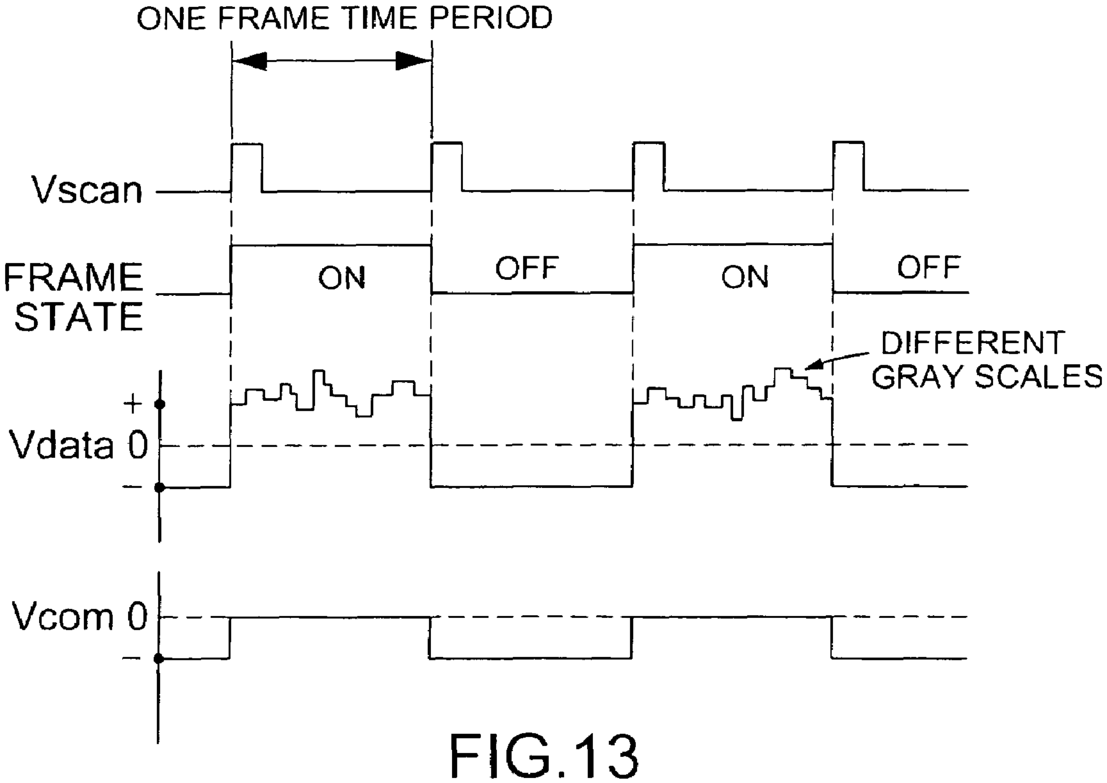
FIG.13 PRIOR ART
FIG. 13 is a diagram of voltage waveforms of input signals of the second 3T1C driving circuit of FIG. 12.
Figure 14:
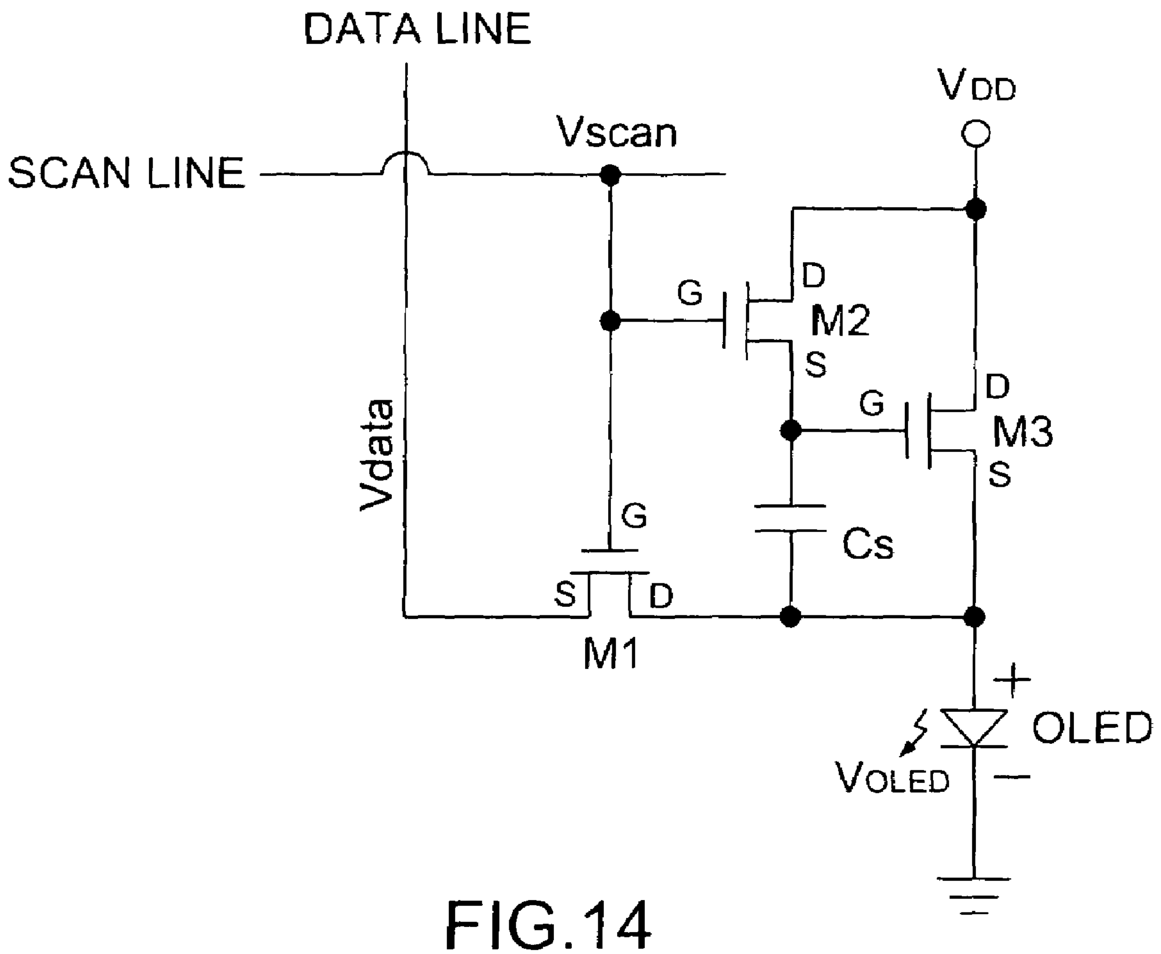
FIG.14 PRIOR ART
FIG. 14 is a circuit diagram of a third 3T1C structure driving circuit in accordance with the U.S. Pat. No. 6,756, 741.

With reference to FIGS. 5A to 5C, the diagrams show voltage waveforms of the driving circuit in one fame when the data line outputs a constant low voltage of the image data signal (about 0 V). Referring to FIG. 5B, the voltage waveforms of the gate and source terminals (G, S) of the driving transistor (M2) show the positive voltage deviation ($\Delta V_N$) generated by the parasitic capacitor ($C_{gd2}$) at the rising time of the controllable voltage source. Referring to FIG. 5C, the driving current (about 0 μA) is generated by the driving transistor (M2) at "ON" state when the controllable voltage source ($V_{DD}$) exists.

The AMOLED driving circuit is a 3T1C structure and overcomes drawbacks existing in the conventional driving circuit. The present invention not only compensates the variable threshold voltage by a driving method but also maintains the driving current in a stable value. Furthermore, the driving circuit does not add any other external control lines to keep the layout of the AMOLED simple.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An AMOLED driving circuit controlling one light-emitting device in one pixel and connecting to a scan line providing scanning voltage, a data line providing an image data signal, a controllable voltage terminal, a constant low voltage source providing a constant low voltage and the light-emitting device, the AMOLED driving circuit comprising:

a storage capacitor having two ends;

a first switching transistor having a source terminal connected to the data line, a drain terminal connected to one end of the storage capacitor, and a gate terminal connected to the scan line;

a driving transistor having a drain terminal connected to the controllable voltage terminal, a source terminal connected to the other end of the storage capacitor, and the a gate terminal connected to the drain terminal of the first switching transistor;

a second switching transistor having a drain terminal directly connected to the controllable voltage terminal, a source terminal connected to the source terminal of the driving transistor, and a gate terminal connected to the scan line; and a controllable voltage source producing a pulse width modulation signal with high and low voltage levels in a frame time of the scanning voltage, wherein a modulating cycle of the pulse width modulation signal is corresponding to a time of one frame;

wherein an anode of the light-emitting device is connected to the source terminal of the driving transistor, and a cathode of the light-emitting device is connected to the constant low voltage source.

2. The AMOLED driving circuit as claimed in claim 1, wherein the first and second switching transistors and driving transistor are N-type TFT transistors.

3. The AMOLED driving circuit as claimed in claim 1, wherein the pulse width modulation signal in one frame comprises:

a low voltage level corresponding to a high voltage of the scan line to store a voltage of the image data signal from the data line to the storage capacitor; and a high voltage level driving the driving transistor to active to generate a driving current to the light-emitting device.

4. A driving method for an AMOLED driving circuit, wherein the driving circuit corresponding to one light-emitting device has a first switching transistor connected to a scan line and a data line, a driving transistor connected between a high voltage source and the light-emitting device, a storage capacitor connected among the first switching transistor, the driving transistor and the light-emitting device, and a second switching transistor having a drain terminal directly connected to the high voltage source, a source terminal connected to a source terminal of the driving transistor, and a gate terminal connected to the scan line, with an anode of the light-emitting device is connected to a source terminal of the driving transistor, and a cathode of the light-emitting device is connected to a constant low voltage source, wherein the driving method comprises steps of:

providing a scanning voltage from the scan line to the first switching transistor and the second switching transistor;

providing an image data signal from the data line to the first switching transistor; and providing a pulse width modulation (PWM) signal to the high voltage source, wherein a modulating cycle of the pulse width modulation signal is corresponding to a time of one frame.

5. The driving method as claimed in claim 4, wherein the providing PWM step in one frame time period supplies:

a low voltage level corresponding to a high voltage of the scan line to store a voltage of the image data signal from the data line to the storage capacitor; and a high voltage level driving the driving transistor to active to generate a driving current to the light-emitting device.

* * * * *